(12) United States Patent
Preiss

(10) Patent No.: US 7,226,117 B2
(45) Date of Patent: Jun. 5, 2007

(54) REAR-END SPOILER FOR A FULL-REAR VEHICLE

(75) Inventor: Michael Preiss, Vaihingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/136,424

(22) Filed: May 25, 2005

(65) Prior Publication Data

US 2006/0043770 A1     Mar. 2, 2006

(30) Foreign Application Priority Data

Aug. 28, 2004   (DE) .................. 10 2004 041 720

(51) Int. Cl.
*B60R 27/00*   (2006.01)
(52) U.S. Cl. ................. 296/180.1; 296/180.4
(58) Field of Classification Search ............ 296/180.1, 296/180.2, 180.4, 180.3, 180.5
See application file for complete search history.

(56) References Cited

U.S. PATENT DOCUMENTS

| 4,603,898 | A | 8/1986 | Udagawa et al. |
| 4,881,772 | A | 11/1989 | Feinberg |
| 5,842,734 | A * | 12/1998 | Lechner ............... 296/180.1 |
| 6,637,806 | B2 * | 10/2003 | Kazama ............... 296/180.1 |
| 2001/0035662 | A1 | 11/2001 | Pike et al. |

FOREIGN PATENT DOCUMENTS

| DE | 24 28 616 A1 | 1/1976 |
| DE | 26 49 953 A1 | 5/1978 |
| DE | 27 48 874 A1 | 5/1979 |
| DE | 3631467 | 2/1987 |
| DE | 3625814 | 2/1988 |
| DE | 196 03 122 A1 | 8/1996 |
| DE | 100 28 698 A1 | 12/2001 |

OTHER PUBLICATIONS

*Aerodynamik des Automobils* [Aerodynamics of the Automobile] by Wolf-Heinrich Hucho (1st edition, 1981), p. 183.
European Search Report dated Feb. 7, 2006, Including English translation of relevant portion (Three (3) pages).

* cited by examiner

*Primary Examiner*—Lori L. Lyjak
(74) *Attorney, Agent, or Firm*—Crowell & Moring LLP

(57) ABSTRACT

In a full-rear vehicle, a rear-end spoiler is situated in the rear edge area of the roof above a rear window. To optimize a rear-end spoiler with a given longitudinal extent so that the aerodynamic efficiency is increased, the spoiler is formed by a split wing.

17 Claims, 4 Drawing Sheets

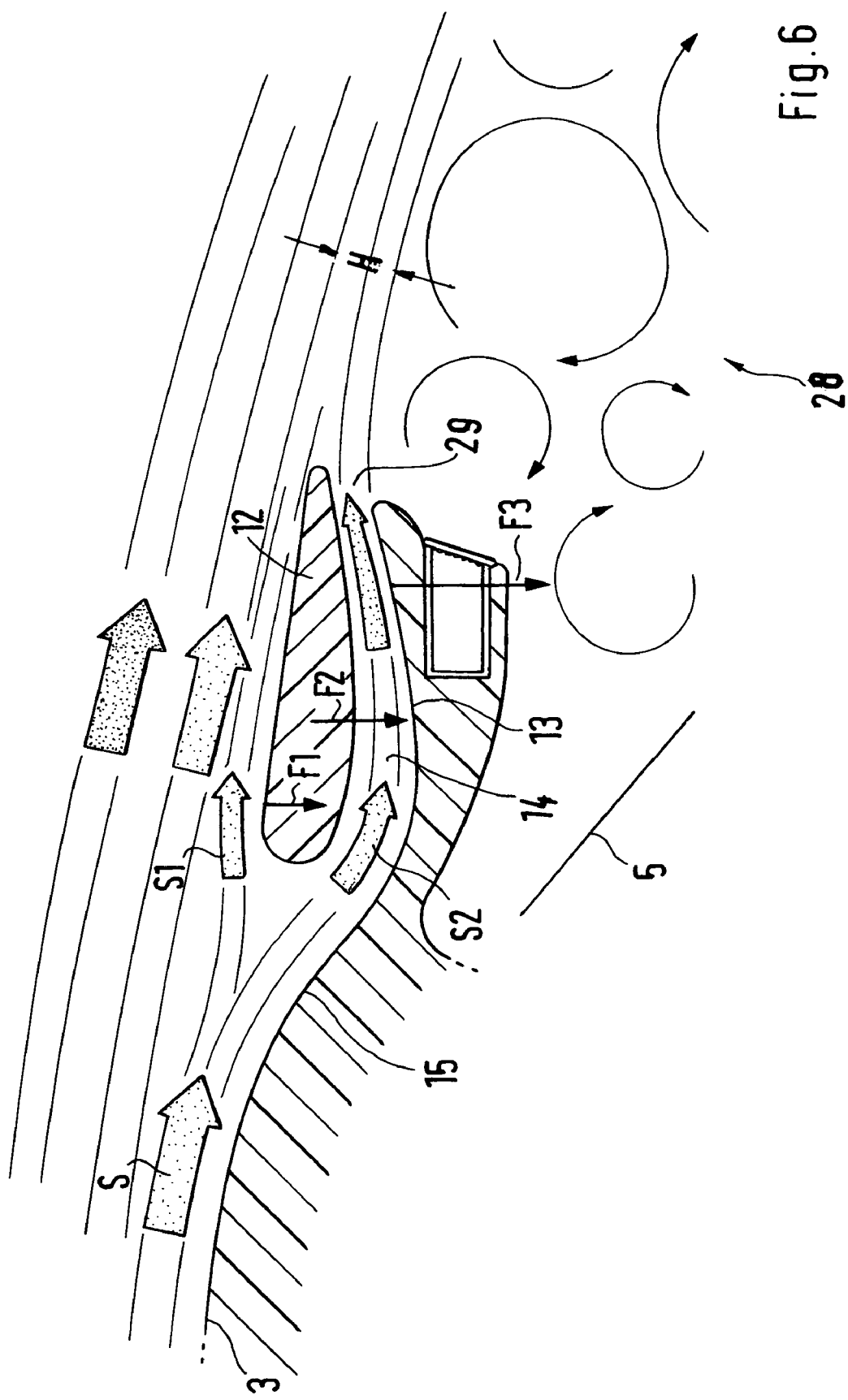

REAR-END SPOILER FOR A FULL-REAR VEHICLE

BACKGROUND OF THE INVENTION

The present invention relates to a rear-end spoiler for a full-rear vehicle.

Full-rear vehicles have a rear-end angle of slope v>30° according tp the textbook "Aerodynamik des Automobils" [Aerodynamics of the Automobile] by Wolf-Heinrich Hucho (1$^{st}$ edition, 1981), page 183.

Experiments have shown that unstable fluid conditions prevail at rear-end angles of slope between 30° and 40° in the rear-end area of the motor vehicle. At a rear-end angle of slope of v<30°, the flow breaks away at the rear edge of the roof with a clearly defined and thus a relatively small vortex wake. At a rear-end angle of slope v>40°, the flow separates at the lower edge of the rear-end slope, accompanied by powerful lateral boundary vortices, which significantly increase the vortex wake and thus greatly increase the aerodynamic forces (resistance and lift). For this reason, the angle of slope range of 30° to 40° was avoided for many years until sport utility vehicles in particular discovered this angle of slope range as the "in" style. As a remedy for aerodynamic problems with "modern" rear-end angles of slope, roof spoilers have been successful in general with such vehicles. For the flow, this results in a rear-end angle of slope that is smaller than optically perceptible. This full-rear roof spoiler thus constitutes an extension of the roof and basically has a lower potential for reducing rear-axle lift. Roof spoilers thus differs from conventional spoilers which generate additional potential for lift reduction with a flow deflection, but in doing so also increase air resistance and therefore have only limited aerodynamic efficiency.

In known full-rear vehicles (e.g., the BMW X5), a roof spoiler aligned with the top of the roof may be arranged in the area of the rear edge of the roof above the rear window, so the rear-end separation edge of the airflow is shifted toward the rear and thus the dead zone behind the vehicle is reduced. The roof spoiler reduces aerodynamic lift on the rear axle and improves air resistance. Because the longitudinal extent of a roof spoiler must be limited for visual reasons, the aerodynamic effect of such a roof spoiler is limited.

SUMMERY OF THE INVENTION

An object of the present invention is to optimize a rear-end spoiler for a full-rear vehicle with a given longitudinal extent to improve the aerodynamic efficiency, i.e., the interaction of aerodynamic lift reduction and the lowest possible air resistance of the vehicle.

According to the present invention, this object has been achieved by forming the spoiler as a gap wing subclaims.

The main advantages achieved with this invention include the fact that in a full-rear-end vehicle the aerodynamic efficiency of the air guide device is greatly improved by the configuration of the rear-end spoiler as a split wing because the split wing in comparison with a traditional roof spoiler supplies lift three times, namely on the top side of the wing, on the bottom side of the wing and in the through-flow channel between the wing and the wing bed. Therefore, with a compact configuration, more output can be achieved at the same or even lower air resistance. Due to the rotatable mounting of the wing, active adjustability of the wing can also be achieved.

BRIEF DESCRIPTION OF THE DRAWINGS

FIG. 6 is a cross-section view similar to that of FIG. 3, but depicting the flow relationships in the area of the spoiler.

DETAILED DESCRIPTION OF THE DRAWINGS

Figure 1:
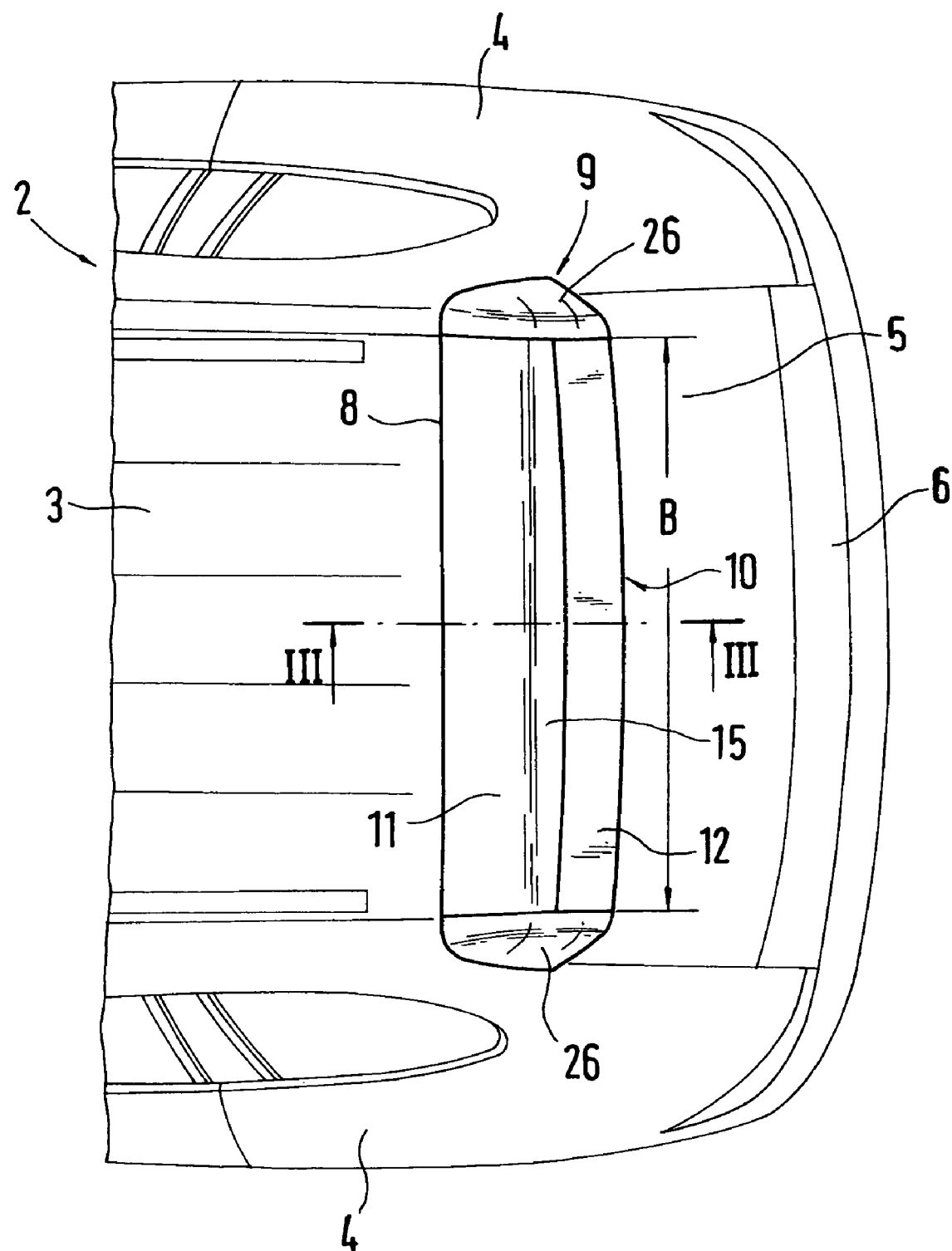
FIG. 1 is a partial top view of the rear-end area of a full-rear-end vehicle with a rear-end spoiler of the present invention.

A motor vehicle 1 formed by a passenger vehicle has a body 2 which is composed of a roof 3, rear side parts 4 and a rear window 5 in the area shown in FIG. 1. In this illustrated embodiment, the rear window 5 is assigned to a rear hatchback 6 which is hinge-connected at its upper edge to the adjacent body 2 with the help of hinges (not shown). The vehicle 1 shown in FIGS. 1 and 3 has a full rear 7, i.e., the rear end is inclined at an angle v greater than 30° from the horizontal. In the embodiment shown, for example, the angle v amounts to 37°.

In order to achieve the lowest possible lift on the rear axle of the vehicle with a low air resistance, a rear-end spoiler 9 configured as a split wing 10 according to the present invention is provided in the area of a rear edge 8 of the roof above the rear window 5. All of the components of the split wing 10 are assigned to a rear-end attachment part 11 which is in one or more parts and is detachably joined to the body 2 there beneath. The attachment part 11 is attached by fastening screws (not shown) to an upper edge area of the hatchback 6. The attachment part 11 has approximately the same width as the hatchback 6 beneath it as shown in FIG. 1.

Figure 3:
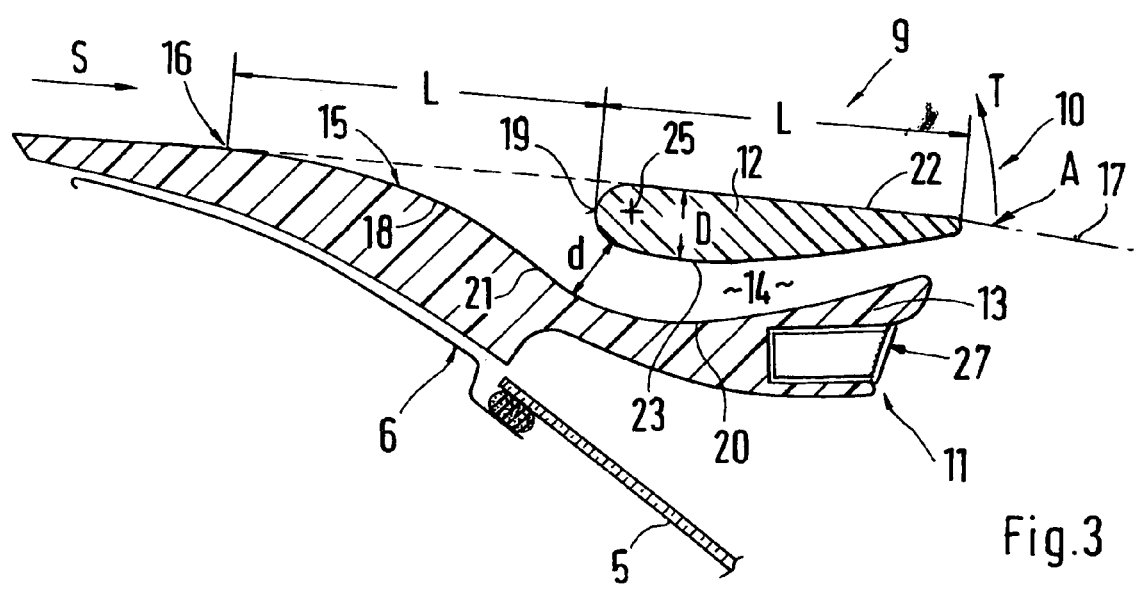
FIG. 3 is a cross-section along line III—III in FIG. 1 on a larger scale.

The split wing 10 includes an upper transverse wing 12, a lower wing bed 13 running crosswise and a gap-type flow-through channel 14 situated between them, with a flow ramp 15 being positioned upstream from the flow-through channel 14 (FIG. 3). The flow ramp 15 on the attachment part 11 in the illustrated embodiment and begins approximately one wing length L in front of the actual wing 12. It could, however, also be provided on the roof 3 or on both parts 3, 11. The edge area 16 of the flow ramp 15 which is at the front as seen in the direction of travel is aligned with the roof streamline 17 and then drops downward over a convex area 18. A concave section 20 is attached just in front of the front edge 19 of the wing 12, forming the top side of the wing bed 13 and/or the bottom side of the flow-through channel 14. In the area of a turning point 21, the convex area 18 develops into the concave area 20.

Figure 2:
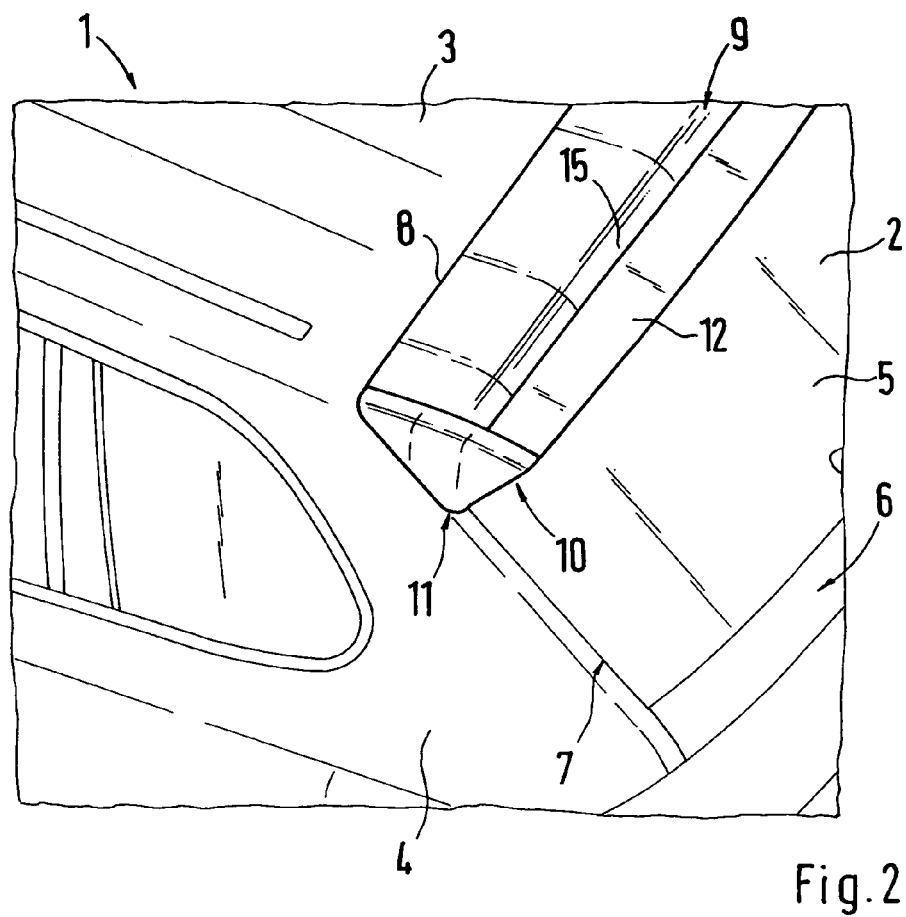
FIG. 2 is a perspective partial view obliquely from the rear of the vehicle with the spoiler of the present invention.

In FIGS. 1 through 3, the wing 12 having a width B is adjusted such that its top side 22 is approximately flush with an imaginary extension of the roof streamline 17 (see FIG. 3). This wing position A which is advantageous in terms of air resistance is preferably used for fast highway driving.

The wing 12 may be either rigidly or adjustably connected to the attachment part 11. The top side 22 of the wing 12 has only a slight upward cambering, whereas the bottom side 23 has a much greater downward curvature. The flow-through channel 14 narrows continuously, as seen in the direction of flow S, and increases toward the rear, with the upper and lower borders of the flow-through channel 14 each having a curved shaped. A rear outflow opening of the gap-shaped flow-through channel 14 is labeled with reference number 29 in FIG. 6.

In the inlet area 24, the flow-through channel 14 is at least as wide (d) as the maximum thickness (D) of the wing 12 as seen in FIG. 3.

Figure 4:
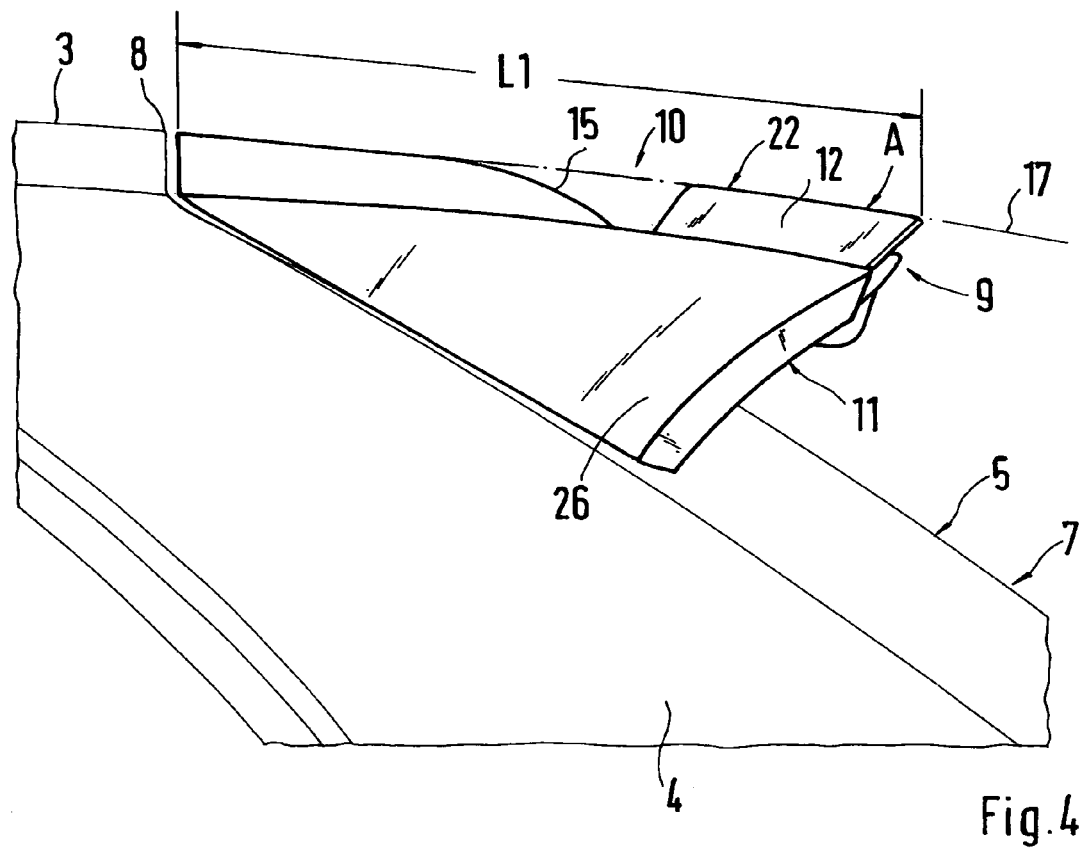
FIG. 4 is a partial side view of the spoiler with a first position of the wing illustrated.

The height of the flow-through channel 14 then reduces continuously toward the rear. The entire longitudinal extent L1 (FIG. 4) of the attachment part 11 corresponds approximately to two to three times the wing length L. In the illustrated embodiment, the wing 12 is connected to side sections 26 of the attachment part 11 running longitudinally about a front rotation axis 25 aligned horizontally and running transversely, whereby an active adjustability of the wing 12 is provided.

Figure 5:
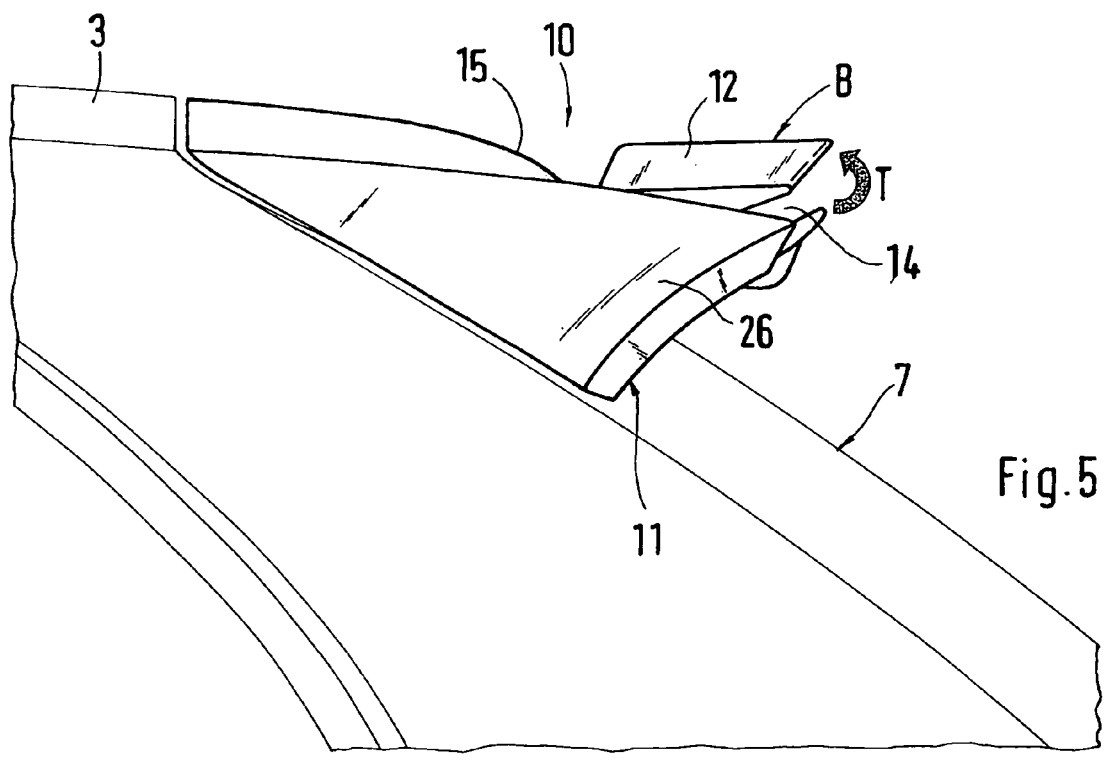
FIG. 5 is a partial side view of the spoiler position shown in FIG. 2 with a first steeply set position of the wing.

If the wing 12 is rotated upward about the rotation axis 25 in the direction of arrow T (wing position in FIG. 5B), then the bypass flow forces thereby created result in an increase in the surface pressure and thus improved traction on the driven rear wheels, i.e., better contact with the road surface and thus a sportier performance. Such an adjustment would be preselected for sporty driving on a racetrack or could be activated by pushing a sport button.

The drive of the wing 12 can be provided via a flex shaft and a transmission. The actuator has to be outside of the attachment part 11 for space saving reasons. A gear wheel, for example, may be used as the transmission.

It is also contemplated to identify the sporty driving state by way of acceleration sensors, speed sensors and/or braking sensors and to adaptively control the wing angle position so that high output forces and the best possible traction are achieved. This does result, however, in increased air resistance. Therefore, when driving fast on the highway the wing position returns to wing position A (FIG. 4) which is more favorable in terms of air resistance (in the course of the roof streamline).

GPS antennas, radio antennas, washer nozzles, elevated brake lights or the like may be provided in the attachment part 11. In the illustrated embodiment, for example, a receptacle for an elevated brake light 27 is situated in a central area of the transverse extent of the attachment part 11 beneath the flow-through channel 14 (FIG. 3).

The function of the rear-end spoiler 9 and the flow conditions in the area of this spoiler are shown in greater detail in FIG. 6. The flow S passes over the roof 3 with hardly any disturbance and is pulled from the flow ramp 15 downward into the roof flow channel 14 so that it is divided into a substream S1 over the wing 12 and a substream S2 into the flow-through channel 14 (i.e., wing gap).

Depending on how sharply the wing 12 is set, the result is a compressive force F1 acting on the surface of the wing top side 22 due to the partial flow S1 (the steeper the adjustment, the higher the pressure and the greater the reduction in lift). The reduced pressure on the surface of the underside of the wing has an even stronger effect because due to the acceleration in the steadily-tapering flow-through channel 14 the partial flow S2 becomes faster and therefore can generate a higher force F2. The same substream S2 also presses against the wing bed 13. This results in a force component F3 acting downward. All three forces ideally act in the direction of the road surface and thereby increase the wheel load acting on the rear axle. Traction is therefore supported and consequently driving safety as well.

Due to the flow-through channel 14 (wing gap), the flow separates at a lower level, i.e., closer to the road surface, so the dead zone 28 is reduced. The bordering zone between the dead zone and less disturbed bypass flow is lowered by the gap height H, as shown by the central section. The separation region which creates air resistance is thus reduced over the entire width of the vehicle and the CW value is reduced.

The wing 12 and/or the remaining attachment part 11 may be made of plastic, carbon fiber or the like. Furthermore, the wing 12 may have the same or different color and/or surface configuration as the remaining attachment part 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Rear-end spoiler for a full-rear vehicle arranged in the area of a rear edge of the roof above a rear window of the vehicle, wherein the spoiler is comprised of a gap wing wherein the gap wing is an upper wing running transversely, a lower profiled wing bed and a flow-through channel which continuously narrows in a flow direction and is situated in between the upper wing and bed wing, with a flow ramp situated upstream from the flow-through channel.

2. Rear-end spoiler as claimed in claim 1, wherein at least the upper wing, the wing bed and the flow-through channel are arranged on a rear-end attachment part which is detachably held in position on the body situated there beneath.

3. Rear-end spoiler as claimed in claim 2, where the flow ramp is operatively arranged on the attachment part or on the roof in front thereof.

4. Rear-end spoiler as claimed in claim 2, wherein the attachment part is operatively attached to a pivotable hatchback.

5. Rear-end spoiler as claimed in claim 2, wherein, the upper wing is one of fixedly and adjustably connected to side sections of the attachment part.

6. Rear-end spoiler as claimed in claim 1, wherein a top side of the upper wing is approximately flush with an imaginary extension of a roof streamline.

7. Rear-end spoiler as claimed in claim 2, wherein the upper wing is pivotably mounted on an adjacent side sections of the attachment part and is adjustable.

8. Rear-end spoiler as claimed in claim 2, wherein the flow ramp begins approximately one wing length in front of the actual upper wing and drops downward from a roof streamline.

9. Rear-end spoiler as claimed in claim 1, wherein the flow-through channel is at least as wide in an inlet area thereof as the maximum thickness of the upper wing.

10. Rear-end spoiler as claimed in claim 2, wherein the attachment part has a receptacle for a brake light in a central area of its transverse extent below the flow-through channel.

11. Rear-end spoiler for a full-rear vehicle arranged in the area of a read edge of the roof above a rear window of the vehicle, wherein the spoiler is comprised of a gap wing, wherein air flow through the gap wing is directed away from the rear window, and the gap wing comprises an upper wing, a lower wing bed and a flow-through channel between the upper wing and the lower wing bed.

12. Rear-end spoiler as claimed in claim 11, wherein at least the upper wing, the lower wing bed and the flow-through channel are arranged on a rear-end attachment part which is detachably held on the body.

13. Rear-end spoiler as claimed in claim 12, wherein a flow ramp is operatively arranged on the attachment part or on the roof.

14. Rear-end spoiler as claimed in claim 12, wherein the upper wing is one of fixedly and adjustably connected to side sections of the attachment part.

15. Rear-end spoiler as claimed in claim 11, wherein a top side of the upper wing is approximately flush with an imaginary extension of a roof streamline.

16. Rear-end spoiler as claimed in claim 12, wherein the upper wing is pivotably mounted on an adjacent side sections of the attachment part and is adjustable.

17. Rear-end spoiler as claimed in claim 12, wherein a flow ramp begins approximately one wing length in front of the upper wing and drops downward from a roof streamline.

* * * * *